March 13, 1962     W. S. AUGUST     3,025,489
TUBE MOUNTING DEVICE
Filed Aug. 14, 1957
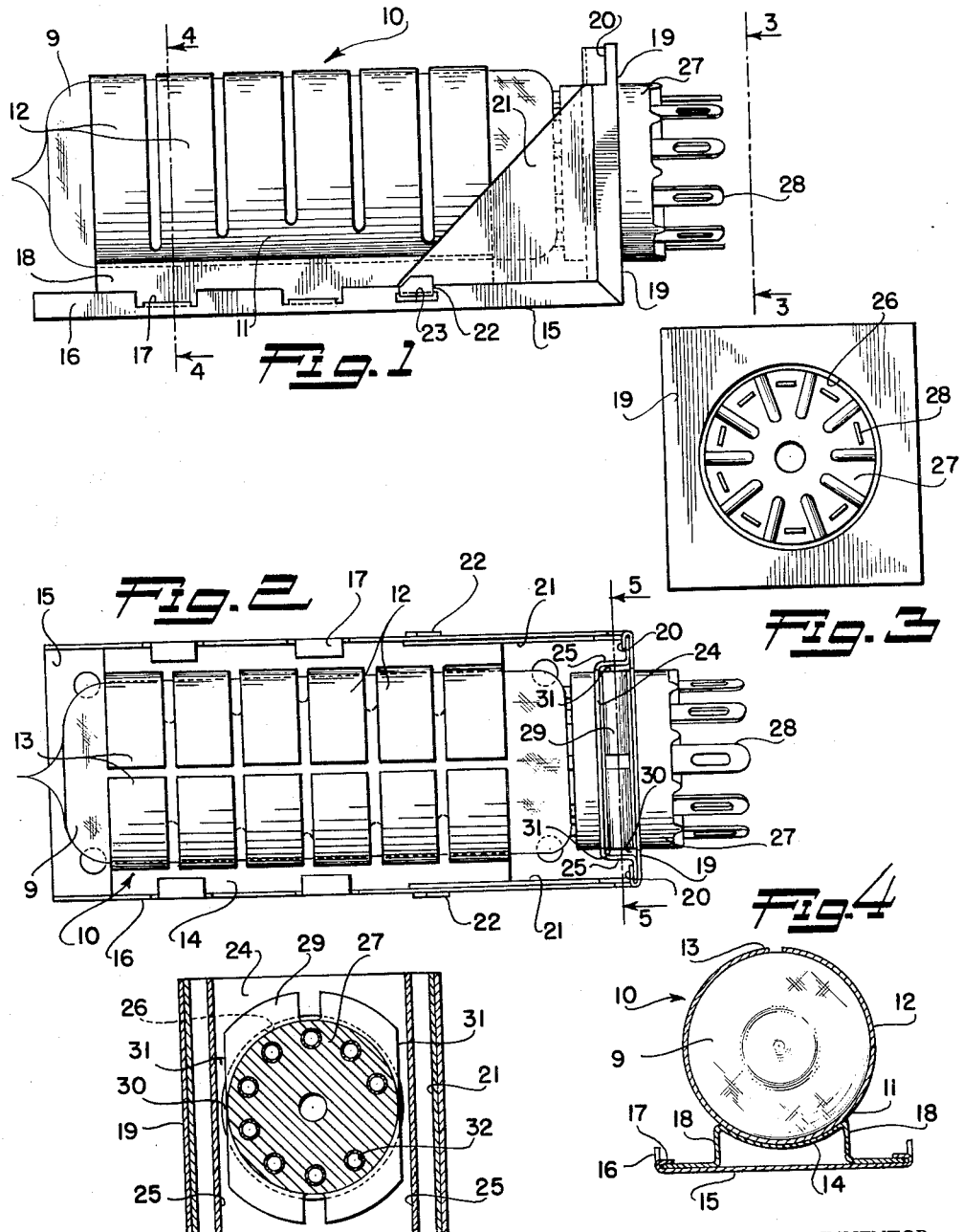
INVENTOR.
WILLIAM S. AUGUST
BY R. E. Geauque
Attorney

United States Patent Office 3,025,489
Patented Mar. 13, 1962

3,025,489
TUBE MOUNTING DEVICE
William S. August, Altadena, Calif., assignor to The Birtcher Corporation, Los Angeles, Calif., a corporation of California
Filed Aug. 14, 1957, Ser. No. 678,229
3 Claims. (Cl. 339—112)

This invention relates to tube mounting devices and more particularly to a mounting device for gripping the body of an electron tube and receiving the prongs of the tube in a socket mounted for restricted movement. The gripping means provide for dissipating heat, generated during the operation of the tube, into the surrounding atmosphere.

In the electronic industry, as well as others, it has been the conventional practice to employ a tube mounting socket or receptacle carried by a chassis of an instrument which receives the prongs projecting from one end of an electron tube within corresponding openings provided in the socket. Normally, electrical circuitry is selectively connected to the opening so that elements within the tube are included in the circuitry when the tube is properly placed in the socket. As the tube operates in accordance with its function in the electrical circuitry, heat is generated by its operation and if excessive, such as after prolonged operation, the operating characteristics of the elements in the tube are affected which may have undesirable effects upon the operating condition of the entire circuitry.

Difficulties have been encountered when employing tube mounting devices in accordance with the conventional practice, which stem largely from the fact that the prongs on ends of the tube are sometimes off-set and thereby proper mating with the openings in the socket is difficult. This problem is encountered perhaps more frequently with respect to miniature and subminiature tubes which have relatively small diameter semi-rigid prongs when compared to conventional radio tubes. Furthermore, a socket may be located on a chassis in a blind spot which is not readily visible for prong alignment with respect to the socket openings so that the tube and the semi-rigid prongs may be inadvertently stressed and strained in order to locate the prongs in their proper openings. Also, it has been a problem to provide a means for dissipating heat generated during the operation of an electron tube which does not interfere with the insertion or extraction of a tube with its respective socket. For example, if the heat dissipating means is supported too close to the tube socket or the tube per se, it is very difficult to manually grip the tube for insertion or extraction from the socket. If the heat dissipating means is located at a substantial distance away from the tube and its socket, the dissipating means will not operate efficiently to absorb heat generated by the tube and perform the operation of transferring heat to the surrounding atmosphere.

These difficulties are obviated in accordance with the present invention wherein a tube socket having suitable openings for receiving prongs on one end of a tube is secured to a mounting in a floating fashion providing limited movement and wherein heat dissipating means are provided which grip the tube when properly inserted into openings in the socket and yet being flexible enough to permit easy insertion or extraction of the tube with its respective socket. The socket is permitted restricted movement so as to compensate for misaligned or any off-set prongs in the end of the tube and the heat dissipating means is of resilient composition to permit expansion of this means during insertion or extraction of the tube and for gripping the tube when the tube has been properly installed.

Therefore, it is an object of the present invention to provide a tube mounting device having a socket portion which readily receives the extended prongs in one end of the tube regardless of misalignment or any off-set of prongs without placing stress upon the tube or prongs and having a clamping means portion for gripping the tube while engaged in the socket and for conducting heat generated by the tube, in operation, into the surrounding atmosphere and into larger areas of heat dissipation.

It is another object of the present invention to provide a clamping means for gripping a tube which is carried by a common mounting with a socket adapted to receive the prongs provided on one end of the tube in order to offer greater stability, reliability of tube operation and ability to withstand heavier side loads applied to the tube than conventional mounting devices.

It is another object of the present invention to provide a resilient clamping means, in combination with a socket, as mentioned immediately above, for gripping the body of the tube seated in the socket and for conducting heat generated during the operation of the tube into the common mounting. This construction provides coaction between the clamping means and socket to simultaneously support the tube and transfer heat to the surrounding atmosphere.

It is another object of the present invention to provide a novel tube mounting device having a floating socket offering restricted movement which can readily accommodate the prongs provided on one end of the tube regardless of moderate misalignment of the prongs or the offset of any prongs without placing stress upon the tube.

Still a further object of the present invention is to provide a novel tube mounting device which allows restrictive movement of the tube socket while supporting the socket and tube in a rigid relationship.

These and other objects of the invention not specifically set forth, will become readily apparent from the accompanying description and drawings in which:

FIGURE 1 is a side elevational view showing a novel tube mounting device employing the combination of a heat clamp and a tube socket according to the present invention;

FIGURE 2 is a front elevational view of the combination heat clamp and tube socket of FIGURE 1;

FIGURE 3 is a bottom view showing the tube socket taken in the direction of arrows 3—3 of FIGURE 1;

FIGURE 4 is a cross sectional view of the device of FIGURE 1 taken in the direction of arrows 4—4 illustrating the heat clamp portion of the tube mounting device; and FIGURE 5 is a cross sectional view of the device of FIGURE 2 taken in the direction of arrows 5—5 illustrating the socket portion of the tube mounting device.

With reference to FIGURES 1 and 2, a tube mounting device is shown in accordance with the present invention, wherein the clamp portion comprises a barrel 10 which is solid at a base 11 and is provided with a plurality of semi-circular resilient fingers 12 extending upwardly from each side of the base. The upper ends 13 of the fingers associated with one side are adjacent to the upper ends of the fingers associated with the other side and in close proximity therewith whereby the fingers can be sprung apart upon the insertion of a tube 9 within the barrel 10 so that the return of the fingers grips the body of the tube. The base of the barrel is brazed to a cradle 14 which is, in turn, soldered to a base plate 15. This construction is shown more clearly with reference to FIGURE 4. A pair of upright edges 16 of the base plate are crimped at reference character 17 to hold a pair of legs 18 on to the base plate 15. The base 15 is bent forwardly to form a front panel 19 and upper edges of the panel 19 are crimped at reference characters 20 to secure a pair of gussets 21 separated by a barrel 10.

The gussets are of triangular shape, each of which has an end clip 22 which is secured through an opening 23 in the upright edge 16 of the base plate 15. The pair of gussets are integrally connected by a member 24 provided between the pair of gussets which is raised from panel 19 by a pair of L-shaped elements 25 so that the member is held in fixed spaced relationship from the panel.

In reference to FIGURES 3 and 5, both front panel 19 and member 24 contain concentric circular openings 26 which are larger than a circular socket body 27 having a plurality of connector pins 28 suitably fitted through and retained in openings such as opening 32. The body 27 normally has a circular ridge 29 and this circular ridge is located between the front panel 19 and member 24. However, a space 30, as seen in FIGURE 2, between the portions 25 is less than the diameter of the ridge 29 so that the ridge 29 is provided with a pair of flat sides 31, as shown more clearly in FIGURE 5, in order to be received between the front panel 19 and member 24 and the portions 25. The distance between sides 31 is less than the distance between the portions 25 so that some rotation or restricted movement of the body 27 is permitted. Since the opening 26 of the front panel 19 and member 24 are larger than the body 27 and since the distance between the sides 31 is less than the distance between portions 25, the socket is permitted restrictive movement in its support between the panel 19 and member 24.

Thus, the socket can be moved to locate the socket opening 32 in position to receive the plugs projecting from the end of electron tube 9 and provide for any misalignment between the barrel and the socket and for any off-set of the prongs on the tubes without placing stress on the tube and the clamp. Because of the construction of the clamp, the clamp has good heat conduction properties. The fingers 12 can be constructed of a silver alloy or beryllium copper having good spring qualities and heat conducting properties. The barrel 10 is brazed to the cradle 14 and the cradle 14 is soldered and crimped to the base 15 so that the cradle is in intimate contact with the base. The base 15 can be constructed of pure copper since mechanical strength is provided by the pair of gussets 21 including member 24. The legs 18 of the cradle also provide a large area of contact with the base plate 15 and thereby form a part of the heat dissipating means. The cradle 14 can be constructed of annealed dead soft copper so that when it is fastened to the barrel 10 and base 15 it will provide good heat conducting qualities and good vibration damping characteristics. The pair of gussets 21 can be constructed of beryllium copper or any other material which provides suitable strength and mechanical strength and mechanical support for the base plate 15 and the front panel 19. The flat surfaces 31 on the socket can be placed in any desired position with respect to the openings 32 to insure proper orientation of the socket with the prongs of the tubes. Thus, the combination of a heat clamp and floating socket of the present invention reduces stress between the socket and the tube and provides for good heat conduction from the tube to the base, since the materials in contact with the tube have excellent heat conducting characteristics while the gussets 21 provide the necessary mechanical strength. The clamping portion of the tube mounting device aids the socket portion thereof in supporting the tube while the socket portion including the base plate 15 and gussets 21 aid the heat clamp in transferring the heat to the surrounding atmosphere from the tube. Various modifications are contemplated by those skilled in the art without departing from the spirit and scope of the invention as hereinafter defined by the appended claims.

What is claimed is:

1. A tube mounting device comprising a base plate having a front panel formed at substantially right angles thereto, a substantially U-shaped cradle fixed to said base so that the interconnecting web portion of said cradle is in spaced relationship with respect to said base, a barrel carried by and fixed to said interconnecting web portion of said cradle, said barrel having a solid base portion and a plurality of semicircular resilient fingers extending upwardly on oppositely disposed sides from said solid base portion, the upper ends of each of said fingers associated with one side being positioned adjacent to the upper ends of said fingers associated with the other side and in close proximity thereto so that said fingers can be sprung apart upon insertion of the tube for firmly holding said tube therein, a pair of gussets positioned on opposite sides of said barrel and interconnected with said base and said front panel, a mounting member integrally connecting said gussets and having a web portion disposed in spaced substantially parallel relationship with respect to said front panel, and a tube socket carried by said front panel and said mounting member for receiving the socket of said tube.

2. A tube mounting device comprising: a base plate having a front panel formed at substantially right angles thereto, a substantially U-shaped cradle fixed to said base so that the interconnecting web portion of said cradle is in spaced relationship with respect to said base, a barrel carried by and fixed to said interconnecting web portion of said cradle, said barrel having a solid base portion and a plurality of semicircular resilient fingers extending upwardly on oppositely disposed sides from said solid base portion, the upper ends of each of said fingers associated with one side being positioned adjacent to the upper ends of said fingers associated with the other side and in close proximity thereto so that said fingers can be sprung apart upon insertion of the tube for firmly holding said tube therein, a pair of gussets positioned on opposite sides of said barrel and interconnected with said base and said front panel, a mounting member integrally connecting said gussets and having a web portion disposed in spaced substantially parallel relationship with respect to said front panel, and a tube socket carried by said front panel and said mounting member in floating relationship thereto for receiving the socket of said tube.

3. A tube mounting device as defined in claim 2 wherein said mounting panel and said interconnecting web include concentric openings formed therein and said tube socket includes a peripheral ridge which is greater in diameter than the diameter of the socket, said ridge being located in the space formed between said support panel and interconnecting web and being of a thickness less than said space so that said socket is permitted predetermined axial movement, said ridge having oppositely disposed flat substantially parallel sides, the diameter of said ridge being greater than the distance between said mounting legs and the distance between said flat sides being less than the distance between said mounting legs so that said socket is permitted predetermined restrictive rotative movement between said mounting panel and said interconnecting web.

References Cited in the file of this patent
UNITED STATES PATENTS

| | | |
|---|---|---|
| 1,418,171 | Raettig | May 30, 1922 |
| 1,739,748 | Brower | Dec. 17, 1929 |
| 2,438,371 | Marholz | Mar. 23, 1948 |
| 2,461,658 | Roup | Feb. 15, 1949 |
| 2,536,652 | Metcalfe et al. | Jan. 2, 1951 |
| 2,766,020 | Woods | Oct. 9, 1956 |
| 2,787,735 | Scal | Apr. 2, 1957 |
| 2,808,576 | Brown | Oct. 1, 1957 |
| 2,852,594 | Amand | Sept. 16, 1958 |
| 2,882,510 | Colvin | Apr. 14, 1959 |

FOREIGN PATENTS

| | | |
|---|---|---|
| 240,918 | Great Britain | Oct. 9, 1925 |

OTHER REFERENCES

Electronic Design, April 1955, page 116.